UNITED STATES PATENT OFFICE.

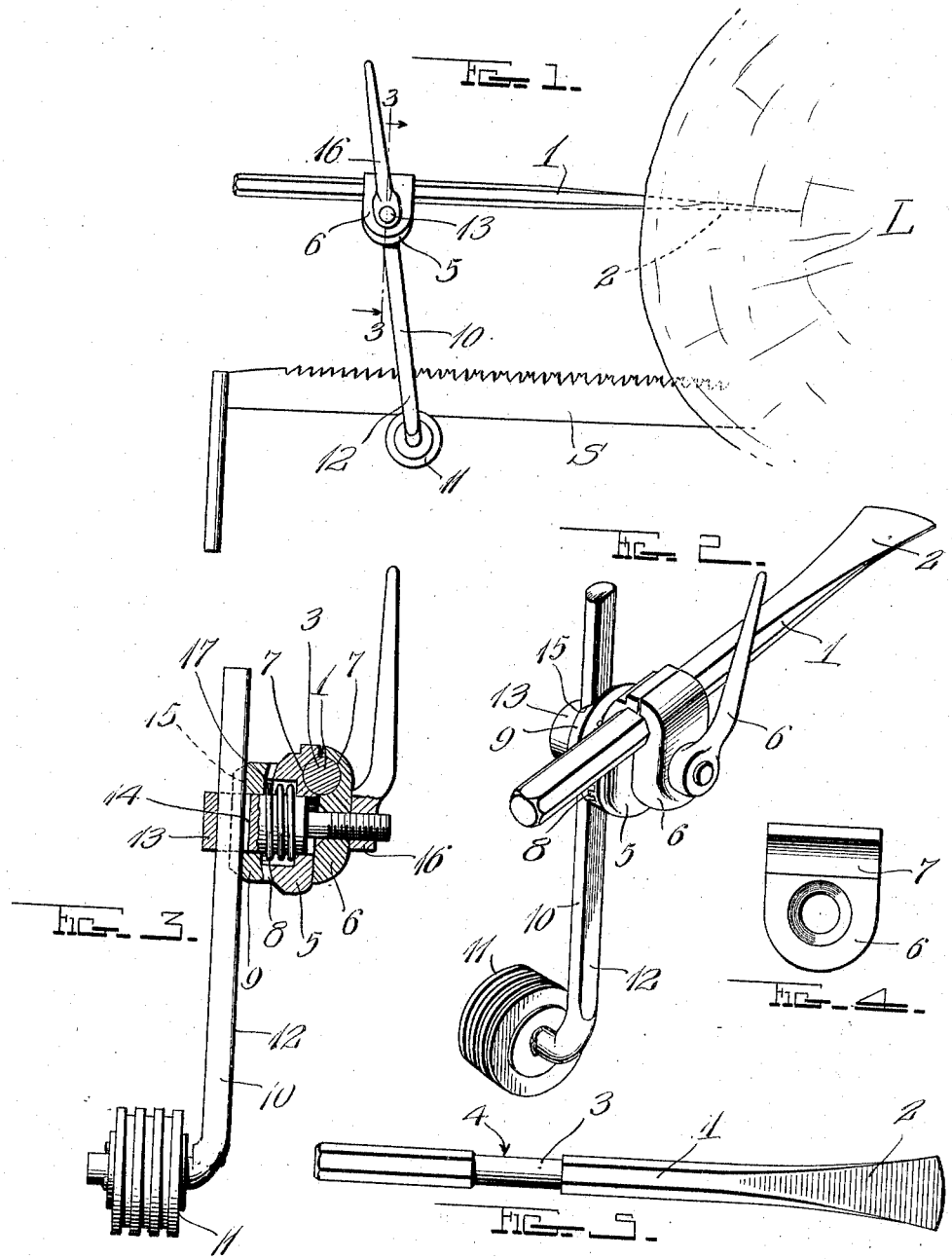

JOSEPH H. WHILT, OF HOQUIAM, WASHINGTON.

UNDERCUTTER-SUPPORT.

1,316,127.  Specification of Letters Patent.  Patented Sept. 16, 1919.

Application filed July 20, 1918. Serial No. 245,822.

*To all whom it may concern:*

Be it known that I, JOSEPH H. WHILT, a native-born citizen of the United States, residing at Hoquiam, in the county of Grays Harbor and State of Washington, have invented certain new and useful Improvements in Undercutter-Supports; and I do declare the following to be a full, clear, and exact description of the invention, such as will enable others skilled in the art to which it appertains to make and use the same.

My invention relates to improvements in devices used for supporting cross cut saws in an inverted position while cutting upwardly upon logs and the like, and the principal object is to provide a device of this class in which the arm carrying the saw supporting roller is rotatable around the anchoring spike which is driven into the log, thus permitting the roller to be located exactly at the required point, even though the wedge should turn while being driven into the log, as often occurs due to irregular grain in the wood or to an awkward position in which the sawyer must stand while driving the spike, due to brush, etc.

With the foregoing object in view, the invention resides in the novel features of construction hereinafter fully described and claimed, and shown in the accompanying drawing.

In Figure 1 of the drawing is shown a side elevation of the invention applied.

Fig. 2 is a perspective view of the device.

Fig. 3 is a vertical section on the plane indicated by the line 3—3 of Fig. 1.

Fig. 4 is an inner side elevation of one of the jaws of the clamp.

Fig. 5 is a side elevation of the spike.

In the drawing above briefly described, the numeral 1 designates a spike having a flattened end 2 to be driven into the log to be cut, said spike being reduced between its ends to provide a cylindrical portion 3 and a peripheral groove 4. A pair of clamp jaws 5 and 6 have one end received in the groove 4 on opposite sides of the cylindrical portion 3 and are provided with grooves or channels 7 receiving said portion as seen clearly in Fig. 3, whereby the clamp is free to turn around the spike 1. The jaw 5 is provided with teeth 8 coacting with similar teeth on a washer 9 through which an arm 10 passes, said arm carrying the saw supporting roller 11 and being flattened on one side at 12 for contact with the aforesaid washer. A clamping bolt 13 passes through the two jaws 5 and 6 and through the washer 9 and is provided with a transverse opening 14 through which the arm 10 projects, whereby to retain said arm in a transverse groove 15 formed in the outer face of said washer. The end of bolt 13 remote from the opening 14 has threaded thereon a lever nut 16 and when this nut is tightened, the clamp jaws 5 and 6 tightly grip the spike 1, the two sets of teeth are interengaged and held, and the arm 10 is clamped against the washer 9. When the nut is loosened, a coiled spring 17 disengages the two sets of teeth and permits adjustment of the washer 9 in respect to the jaw 5. At the same time, the jaws 5 and 6 are loosened from engagement with the spike 1 so that the entire clamp may be rotated upon the latter.

In operation, the spike 1 is driven into the log L substantially as shown in Fig. 1 and by first loosening the lever nut 16, the necessary adjustments may be made to position the roller 11 under the saw S. Tightening of the lever nut will then retain all parts in operative position. The mounting of the clamp upon the spike 1 in such a manner as to permit turning of the former upon the latter, is a highly important feature, since by this means the roller may be properly positioned, even though the spike shall turn a considerable amount while being driven into the log. Since probably the best results are obtained from the details shown and described, they art by preference followed, but within the scope of the invention as claimed, considerable latitude is allowed for making such changes as occasion may indicate.

I claim:

1. An undercutter support comprising a spike adapted to be driven into the log to be cut, said spike having a cylindrical portion extending longitudinally thereof, an arm carrying a saw supporting shoe, and a clamp connecting said arm to said spike and rotatable transversely around said spike on said cylindrical portion thereof.

2. An undercutter support comprising a spike adapted to be driven into the log to be cut, said spike being reduced between its ends to simultaneously provide a longitudinal cylindrical portion and a peripheral groove, a pair of clamp jaws on opposite sides of said cylindrical portion and received at one end in said groove, said jaws having channels rotatably receiving said cylindrical portion of the spike, a clamping bolt passing through said jaws and having a transverse opening, a washer having an external transverse groove, said washer being mounted on said bolt, coacting teeth on said washer and the adjacent clamp jaw, an arm passing through the aforesaid opening of said bolt and received in the external groove of said washer, a saw supporting shoe carried by said arm, and a clamping nut threaded on the end of said bolt remote from said opening and bearing against the adjacent clamp jaw.

In testimony whereof I have hereunto set my hand.

JOSEPH H. WHILT.

Copies of this patent may be obtained for five cents each, by addressing the "Commissioner of Patents, Washington, D. C."